United States Patent [19]

Perkins et al.

[11] Patent Number: 5,160,096
[45] Date of Patent: Nov. 3, 1992

[54] GAS TURBINE CYCLE

[75] Inventors: Gary M. Perkins, Palm Beach Gardens; Donald M. Podolsky, Jupiter; James J. Kana, West Palm Beach, all of Fla.

[73] Assignee: United Technologies Corporation, Hartford, Conn.

[21] Appl. No.: 774,908

[22] Filed: Oct. 11, 1991

[51] Int. Cl.[5] ............................................. F02C 7/16
[52] U.S. Cl. ................................ 60/39.05; 60/39.54; 415/114
[58] Field of Search .............. 60/39.05, 39.12, 39.53, 60/39.55, 39.58, 39.59, 728; 415/114

[56] References Cited

U.S. PATENT DOCUMENTS

| | | | |
|---|---|---|---|
| 2,647,368 | 8/1953 | Triebbnigg et al. | 60/39.05 |
| 4,338,780 | 7/1982 | Sakamoto et al. | 60/39.05 |
| 4,448,018 | 5/1984 | Sayama et al. | 60/39.53 |
| 4,571,935 | 2/1986 | Rice | 60/39.05 |
| 4,773,846 | 9/1988 | Munk | 60/39.05 |
| 4,820,116 | 4/1989 | Hovan et al. | 415/115 |
| 4,829,763 | 5/1989 | Rao | 60/30.05 |
| 4,982,564 | 1/1991 | Hines | 60/39.53 |
| 4,991,391 | 2/1991 | Kosinski | 60/39.59 |
| 5,003,766 | 4/1991 | Paul | 415/114 |

*Primary Examiner*—Louis J. Casaregola
*Attorney, Agent, or Firm*—Edward L. Kochey, Jr.

[57] ABSTRACT

In a humid air gas turbine cycle the compressed air is humidified prior to introduction to the combustor. Compressed air before humidification is used to cool the first turbine stage rotor blades. Humidified air is used to cool the first turbine stage stationary vanes.

2 Claims, 2 Drawing Sheets

GAS TURBINE CYCLE

DESCRIPTION

Technical Field

The invention relates to gas turbine vane and blade cooling, and in particular, to such cooling in a humid air gas turbine cycle.

Background of the Invention

A humid air turbine cycle is described in U.S. Pat. No. 4,829,763. Compressor exhaust from a gas turbine engine compressor is humidified by direct contact with a water supply. The humidified air is used in a gas turbine combustor as the combustion supporting air. This humidified air is first preheated by turbine exhaust products.

Feed water to the humidifier is preheated by using the feed water for interstage compressor cooling and for further gas turbine exhaust product cooling. Occasionally this feed water is also used for precooling the compressor exhaust.

In conventional, or simple cycle gas turbine engines, turbine component cooling is accomplished by bleeding air from the high pressure compressor and delivering metered amounts to the cooling passages within turbine seals, cavities and airfoils. This process maintains material temperatures within limits commensurate with desired part lives. The amount of cooling air required for each part is a function of the desired metal temperature, the pressure and temperature of the coolant, the effectiveness of the cooling scheme in each part and the temperature of the flow path gas.

For a given flow path temperature, turbine cooling flow can be reduced by increasing the effectiveness of the cooling scheme, by using a material which permits a higher allowable metal temperature, or by reducing the temperature of the coolant. Generally, turbine cooling has a detrimental effect on cycle performance. On the other hand turbine cooling allows a significant increase in the gas turbine inlet temperature. The cycle benefits from the high inlet temperature, overwhelms the penalties of the cooling bleed. The favorable trade between high gas path temperature and air cooling of hot section parts has improved the gas turbine over recent years.

A basic requirement for any cooling scheme is for the cooling air to have a higher pressure than the gas path fluid at the point of injection. The turbine cooling air exits the cooling part once it has performed its cooling function and enters the primary gas path. The outflowing air from the cooled part prevents ingestion of hot gas within the cooling passages of the part. The outflowing air can form a cooling zone on the exposed metal which further enhances cooling effectiveness and protection of the part. Allowing the cooling flows to reenter the gas path adds working fluid to the expansion process through the downstream portion of the turbine.

Cooling air for the initial turbine stages must generally come from the high compressor discharge, or more conveniently, from the burner diffuser. At this engine station the highest pressure air in the system is found. Because of the pressure loss taken by the main stream gas the combustion process and the reduction in gas path static pressure because of acceleration in the turbine, diffuser bleed air has ample pressure to cool the first stage vanes and blades and still enter the gas path. Diffuser air is, however, the hottest cooling source in the system and is also the most expensive air in the system in terms of energy spent to compress the coolant.

For turbine parts downstream of the first stages, gas stream pressure drops significantly. For these parts we may provide the cooling from lower pressure compressor sources. Such cooling does not form a part of the present invention but is used in conjunction therewith.

SUMMARY OF THE INVENTION

As in the conventional humid air gas turbine cycle, air is compressed to a predetermined level to form compressed air. This air is humidified to form a gaseous medium which is delivered to the combustor. This humidified air is the combustion supporting air for the burning of fuel in the combustor.

The first stage vanes located upstream of the turbine rotor are cooled by passing a portion of the gaseous medium which has been humidified through the vanes and then to the primary gas flow path. The first stage turbine blades on the other hand are cooled by the compressed air which has not yet been humidified with this air then passing into the primary gas stream.

The gaseous medium for cooling the first stage vanes may be preheated prior to the cooling operation by passing this medium in heat exchange relation with the turbine exhaust products.

The use of the humidified air for cooling the first stage vanes requires more flow than the compressed air per se, because of the high temperature of the mix. However, this entire coolant flow passes through the entire turbine so that power generation is achieved with the entire flow. Cooling of the first stage blade on the other hand uses only the air without the vapor being added, thereby avoiding bypass of excessive amounts of coolant around the first stage blades which would cause a loss in power generation.

DESCRIPTION OF THE PREFERRED EMBODIMENT

Figure 1:
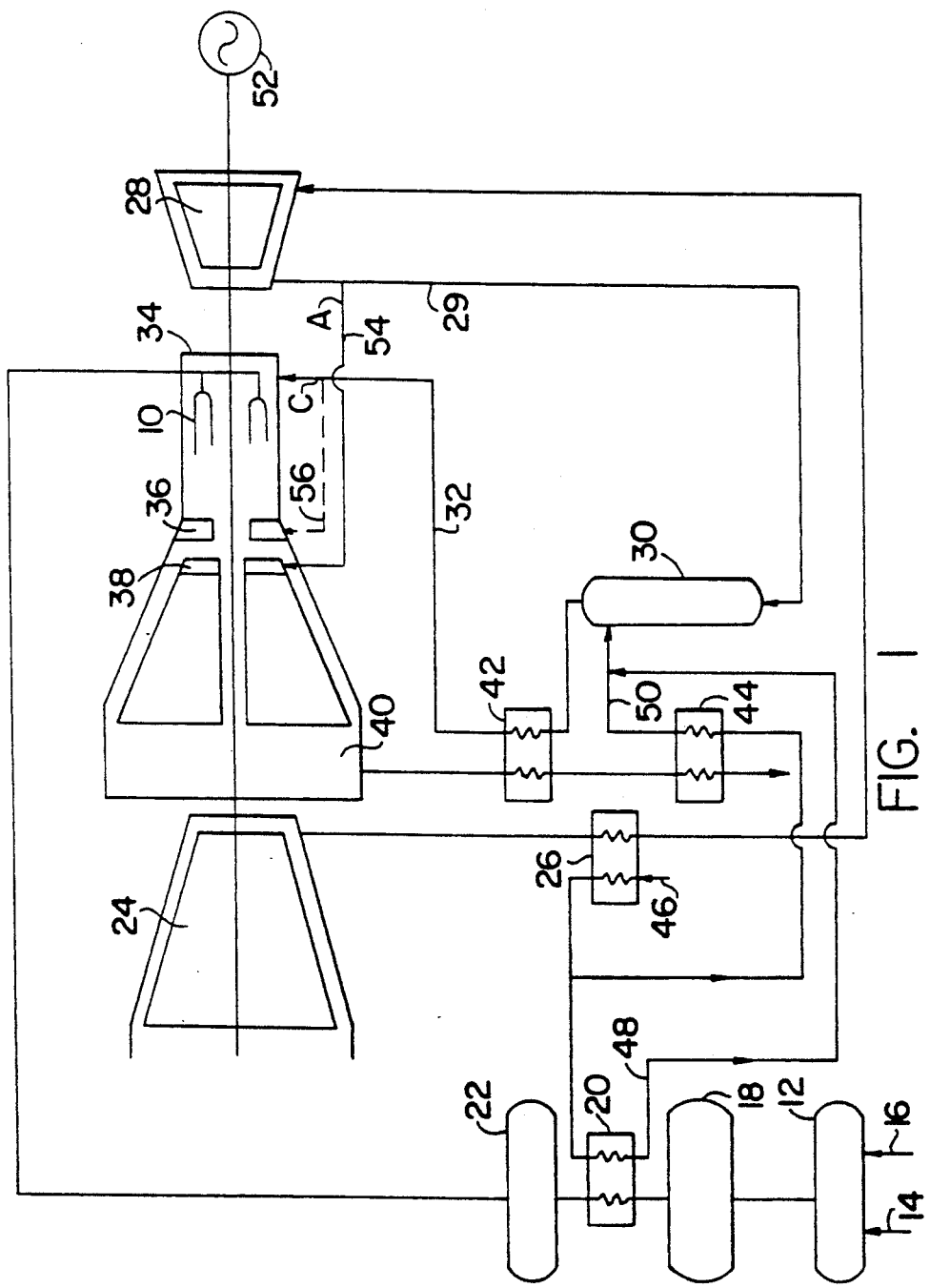
FIG. 1 is a schematic view of the cycle.

Referring to FIG. 1, the fuel supply to combustor 10 comes from gasifier 12 where fuel 14 and air 16 is supplied. After quench tank 18 the gas passes through precooler 20 to disulfurizer 22. This low BTU gas is then supplied to combustor 10.

Low pressure compressor 24 discharges air at 72 Psia and 448° F. through intercooler 26 to the high pressure compressor 28. The discharge of compressed air at 541 Psia and 608° F. from the high pressure compressor passes through line 29 to humidifier or saturator 30. It then passes at 522 Psia and 388° F. to heat exchanger 42. At 512 Psia and 831° F. it passes through line 32 to a diffuser area 34 where it is used as combustion supporting air in the combustor 10.

First stage stationary vanes 36 experience the full temperature of the gas leaving the combustor. First stage turbine blades 38 located on the rotor experience the temperature of the gases leaving the first stage vanes 36. Gas turbine exhaust products at a temperature of 900° F. pass from the turbine exhaust products 40 through heat exchanger 42. Heat from the exhaust gas is thereby transferred to the incoming humid air passing through line 32.

Turbine exhaust gases may be further cooled in heat exchanger 44 where they pass in heat exchange relationship with incoming feed water which is being supplied to humidifier 30.

Makeup water 46 is heated in passing through intercooler 26. A portion of this is further heated in heat exchanger 20 passing through line 48 to the humidifier 30. Another portion is heated in the heat exchanger 44 passing through line 50 to the humidifier 30.

A shaft connected generator 52 generates electric power.

A portion of the compressor exhaust air before humidification which is directed to line 29 passes through line 54, passing through the first stage blades 38 for cooling of the blades. A portion of the humidified air passing through line 32 is schematically shown as passing through line 56 for the cooling of first stage vanes 36.

Figure 2:
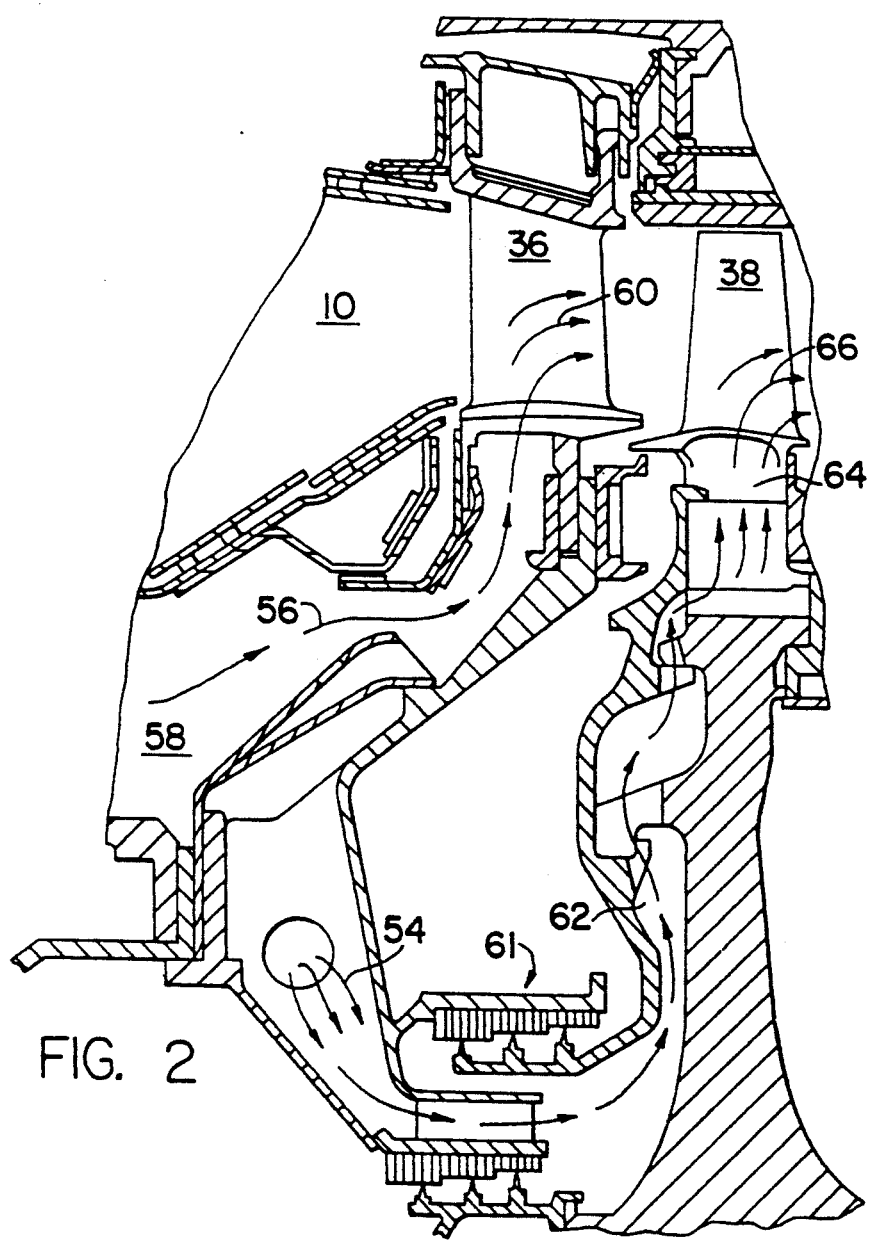
FIG. 2 is a sectional view showing one arrangement of the vanes and blades for the introduction of the cooling air flows.

FIG. 2 is a section of a portion of the turbine illustrating a means of conducting the cooling flows to the vane and blades. The humidified air or gaseous medium 56 being supplied to the combustor area accessing the zone 58 surrounding the combustor. It may then be passed directly to the interior of first stage vanes 36 through any desired cooling path, with outlet flow 60 passing from the vanes in a manner to achieve film cooling of the vanes.

Flow through line 54 may pass into a portion of the stator assembly where it is transferred through a tangential outboard injection connection 61 into a rotating zone 62 of the rotor. It is then directed upwardly through roots 64 of first stage blades 38. The air passes through the blades in a selected cooling path with the outflow 66 being directed for film cooling of the blades.

For discussion purposes the source of cooling fluid is indicated as A or C. A is the unhumidified compressed air directed into line 29 from the high pressure compressor outlet. Flow C is the humidified air which is being directed to the combustion chamber.

The coolant for the first stage vane 36 is selected as flow C which is the humidified air. This coolant after it discharges from the vanes passes through the entire turbine and therefore is available for power generation. The flow contains not only 33.7 pounds per second of air but also 16.3 pounds per second of vapor for a total flow of 50.0 pounds per second. This is a higher flow than would be required if only air were being supplied since this is at a higher temperature level than the air from A. The excess flow is not a detriment however because of the complete power recovery.

The first stage blade on the other hand does not use the humidified air. The cooling fluid for the first stage blade is from source A prior to humidification. This results in a lower flow of air which is preferred since this coolant bypasses the first stage of turbine insofar as power generation is concerned.

Table 1 shows comparative values of various possibilities of cooling of the vanes and blades from these two sources. In the first column is listed the present scheme with the vane flow from source C and the blade flow from source A. The lowest heat rate is achieved and accordingly the highest in efficiency. The power is amongst the highest, and the permitted combustion temperature for a fixed 2507° F. inlet temperature is the highest at 2539° F.

The flow to the vanes and blades is shown as air, vapor, and total.

The use of a coolant from either A or C which is available adjacent the gas turbine engine has advantages over other sources throughout the power plant cycle. Blockage of any of these lines is minimized as well as breakage.

TABLE 1

| Vane Flow | Source | C | A | A | C |
|---|---|---|---|---|---|
| Blade Flow | Source | A | C | A | C |
| Heat Rate | BTU/KWHr | 8526 | 8587 | 8559 | 8548 |
| Net. Eff. | BTU/KWHr | 40.0 | 39.7 | 37.9 | 39.9 |
| Power | % | 210 | 207 | 213 | 205 |
| Combustor Temp. | °F. | 2539 | 2500 | 2500 | 2535 |
| Flow to Vane | Lb/sec Air | 33.7 | 43.1 | 43.1 | 34.5 |
| | Lb/sec Vapor | 16.3 | 0 | 0 | 15.6 |
| | Lb/sec Total | 50.0 | 43.1 | 43.1 | 50.1 |
| Flow to Blade | Lb/sec Air | 19.4 | 15.2 | 19.4 | 15.8 |
| | Lb/sec Vapor | 0 | 7.9 | 0 | 7.2 |
| | Lb/sec Total | 19.4 | 23.1 | 19.4 | 23.0 |

We claim:

1. A method of operating a humid air gas turbine cycle comprising:
   compressing air to a predetermined pressure level to form compressed air;
   humidifying said compressed air to form a gaseous medium;
   delivering said gaseous medium to a combustor;
   burning fuel in said combustor forming high temperature gaseous products;
   passing said gaseous products through a gas turbine for the generation of power, said gas turbine including first stage stationary vanes and first stage turbine blades;
   passing a portion of said gaseous medium through said first stage stationary vanes and thence into said gaseous products for the cooling of said first stage stationary vanes; and
   passing a portion of said compressed air through said first stage turbine blades and thence into said gaseous products for the cooling of said first stage turbine blades.

2. A method as in claim 1, comprising also:
   passing exhaust products from said gas turbine in heat exchange relationship with said gaseous medium, creating a gaseous medium at high temperature; and
   passing said gaseous medium through said first stage vanes in the form of high temperature gaseous medium.

* * * * *